March 24, 1970 F. HOCK 3,502,415
OPTICAL MEASURING INSTRUMENT FOR MEASUREMENT IN
TWO COORDINATE DIRECTIONS
Filed July 7, 1966 3 Sheets-Sheet 1

INVENTOR
FROMUND HOCK.
BY
ATTORNEY.

United States Patent Office

3,502,415
Patented Mar. 24, 1970

3,502,415
OPTICAL MEASURING INSTRUMENT FOR MEASUREMENTS IN TWO COORDINATE DIRECTIONS
Fromund Hock, Wetzlar, Germany, assignor to
Ernst Leitz G.m.b.H., Wetzlar, Germany
Continuation-in-part of application Ser. No. 541,645,
Apr. 11, 1966. This application July 7, 1966, Ser.
No. 563,543
Claims priority, application Germany, July 24, 1965,
L 51,213
Int. Cl. G01b *11/28*
U.S. Cl. 356—167      5 Claims

---

ABSTRACT OF THE DISCLOSURE

An optical measuring instrument for determining the position of an object of measurement in two coordinates simultaneously. A cyclically moving image of a scanning mark such as a transilluminated optical slit is projected onto the object of measurement or a target secured thereto (e.g., a transparent scale) and after reflection of the incident rays conveying the image of said mark from the object or target the dissymetry of light distribution in a pupil in the path of the reflected rays caused by the position of the object or target is determined by means of a circuit comprising two stationary photoelectric cells or one cell which is alternately exposed to two halves of the pupil.

---

Cross reference to related application

The present invention is a continuation-in-part of co-pending U.S. patent application Ser. No. 541,645 filed Apr. 11, 1966; the filing date to which this application is entitled is claimed for all subjects matter thereof common with this application.

Background of the invention

The present invention relates to optical measuring instruments for determining the positions of objects of measurement or targets affixed to such objects relative to the instruments.

An object of the present invention is to provide an instrument capable of simultaneously determing the position of an object or target in two coordinates.

Another object of the present invention is to provide an optical measuring instrument having at least one cyclically moving, light-emitting scanning mark, means for imaging said mark upon an object of measurement, and means for imaging the reflection of said mark from said object upon means which assess the degree of dissymetry of the reflected light distribution in two aspects corresponding to the displacement of said object from a normal position in two coordinates. Said assessing means comprises either two photoelectric cells, or only one such cell by means of which two pupil halves are successively scanned.

Another object of the invention is to utilize structurally similar electrical elements to determine from the signals emitted by the photoelectric cells the position of the object of measurement in two coordinates.

An object of the present invention is the provision of an optical measuring instrument for measuring the lateral position of a target with respect to a fixed point or a coordinate axis and which makes use of cyclically movable elongated light-emitting or reflecting means serving as a scanning mark.

Brief description of the drawings

Other objects and advantages of the present invention will become apparent to those skilled in the art from the following description taken into consideration together with the attached drawings, wherein.

Description of the preferred embodiments

Figure 1:
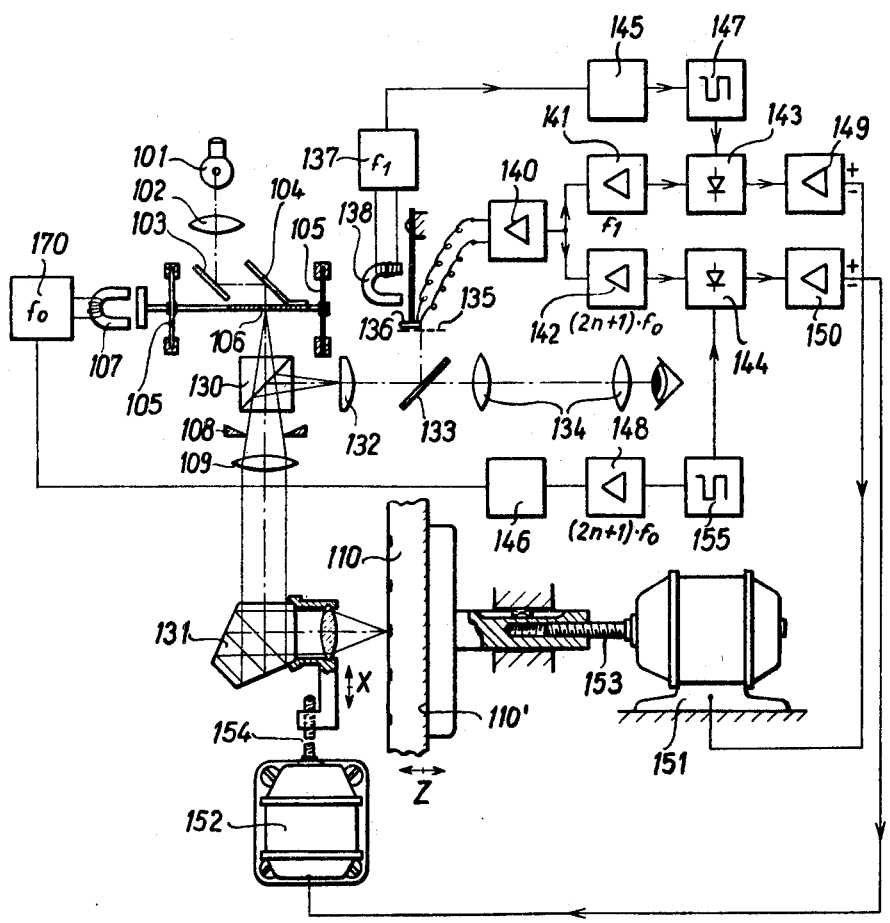
FIG. 1 illustrates an embodiment of the present invention with only one photoelectric cell.

FIG. 1 illustrates an arrangement in which only one photoelectric cell is used. The terms "photoelectric cell" and "photodetector" as used herein denote all types of devices whose electrical properties are altered by the impingement of radiation, and are not limited to photo-emissive devices. A lamp 101 emits light rays which are then guided by a condenser 102, and a mirror combination which consists of a stationary mirror 103, a movable mirror 104 positioned by means of membranes 105, and an optical slit in diaphragm 106 which is movable in synchronism with the mirror 104. The movement of mirror 104 and of diaphragm 106 is effected by means of an electromagnetic system 107, energized by an alternating current generator 170 with a frequency $f_0$. Connected opposite the diaphragm is an optical divider or beam splitter 130. The light-transmitting optical slit in diaphragm 106 is imaged via beamsplitter 130, a pupil diaphragm 108, a collimator 109, and a movable prism-lens combination 131, onto the transparent object of measurement 110 which is in operative engagement with a reflector 110'.

The light which is reflected by reflector 110' passes backwards through the elements 131, 109, 108 and is then reflected at a right angle by means of the divider 130.

The light then passes through a field lens 132 and further divider or beamsplitter 133 whereat the light is divided, part being supplied to an observation ocular 134 and part forming an image in image plane 135. The image formed in plane 135 corresponds to the pupil being determined by the diaphragm 108. A photoelectric cell 136 is so mounted and so moved by an electromagnetic system 138 that it alternately scans two halves of the pupil 108 as imaged at plane 135. Electromagnetic system 138 is energized by a generator 137 of frequency $f_1$.

Connected to photoelectric cell 136 is a preamplifier 140 which is connected to each of two tuned amplifiers 141, 142, one of which amplifiers is tuned or adjusted to frequency $f_1$ while the other is tuned to a frequency $(2n$ plus $1)f_0$. The signal produced at the output of amplifier 141 is compared in a phase-sensitive rectifier 143 with the output signal of generator 137 after the output signal of the latter has passed through a phase shifter 145 and a limiter stage 147. Connected to phase-sensitive rectifier 143 is a direct-current amplifier 149 which feeds a servo motor 151. This motor 151 actuates a worm drive 153 which displaces the object of measurement in the direction of the optical axis of combination 131, i.e. in the direction of the z-coordinate as shown in FIG. 1.

The output signals of amplifier 142 are compared with the signal supplied by the generator 170 after the output signal of the generator has passed through a phase shifter 146, a tuned amplifier 148 tuned to a frequency $(2n$ plus $1)f_0$, and a limiter stage 155. The comparison is carried out in a phase-sensitive rectifier 144 the output of which is connected to a direct-current amplifier 150. The output of D.C. amplifier 150 is then connected to servo motor 152 which is adapted to displace prism-lens combinations 131 parallel to itself along the illustrated X-coordinate by means of a worm drive 154. From the above it may be seen that such an arrangement as heretofore described is suitable for automatically adjusting an object of measurement with respect to two coordinate directions.

It should be noted that the arrangement described hereinabove may be readily modified so that in place of the oscillating photoelectric cell 136 one might employ a rigidly-mounted photoelectric cell cooperating with an oscillating scanning diaphragm.

Figure 2:
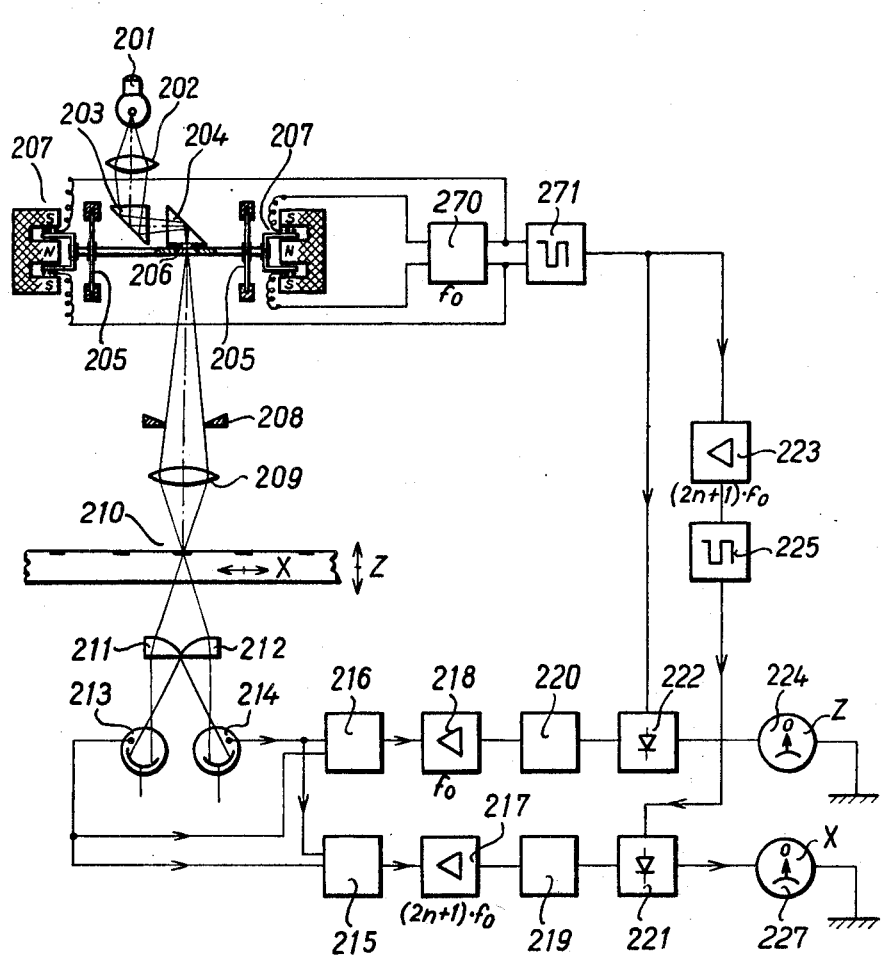
FIG. 2 illustrates an embodiment of the invention with two photoelectric cells.

FIGURE 2 illustrates an embodiment of the multiple measuring instrument of the invention adapted for measurements by transillumination. As is apparent from this figure, a lamp 201 emits light rays which then pass through a condenser 202 and a prism combination which consists of two prisms 203, 204. Prism 204 is movably positioned in the horizontal direction by means of membranes 205, and is adapted to illuminate an optical slit or mark 206 mounted on its lower face as shown in FIG. 2. The movement of the prism is affected by means of electromagnetic system 207 provided with a pair of coils 207. One coil is energized by a generator 270 with alternating current having the frequency $f_0$. The other coil is connected to the input of the generator 270 giving a positive feedback signal. The illuminating mark 206 is reproduced or imaged, by way of a pupil diaphragm 208 as well as a condenser 209, on to the object of measurement 210 or line. Located therebehind are two lenses 211, 212 or other suitable means, respectively directing the intersected light to photoelectric or other suitable means cells 213, 214. The output of each of these cells is simultaneously applied to the inputs of both of the summing amplifiers 215, 216, one of which (215) delivers the sum of the inputs, while the other (216) delivers the difference of the inputs. Connected to amplifier 216 is a tuned amplifier 218 tuned to the frequency $f_0$, and then a phase shifting stage 220. The output signal of the phase shifting stage is compared in a phase-sensitive rectifier 222 with the output signal of a limiter 271 connected to the output of generator 270. The output signal of rectifier 222 indicates, with the aid of an indicating instrument 224, the position of the object of measurement in the direction of the Z-axis as shown in FIG. 2.

Connected to amplifier 215 is a tuned amplifier 217 which is tuned to a frequency $(2n$ plus $1)f_0$ and at the output of which is connected a phase shifting stage 219. The output signal of stage 219 is compared in a phase-sensitive rectifier 221 with the output signal of the generator 270 after the same has passed through limiter 271, a tuned amplifier 223 which is tuned to a frequency $(2n$ plus $1)f_0$, and a limiter stage 225. An indicating instrument 227 connected at the outlet side indicates the position of the object of measurement in the direction of the X-coordinate as indicated in FIG. 2.

Figure 3:
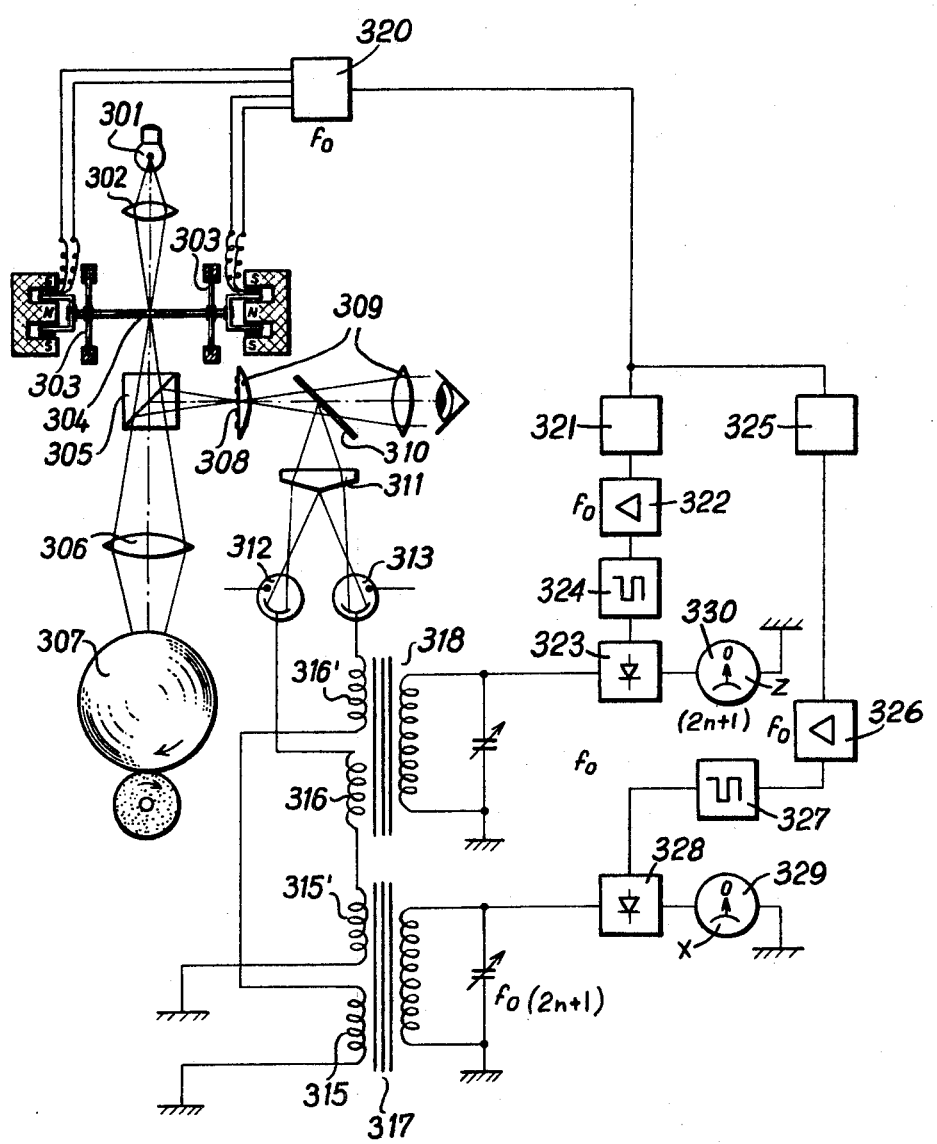
FIG. 3 illustrates an embodiment of the invention with two photodetectors in which the sum and difference signals are produced by means of transformers.

FIGURE 3 illustrates schematically how the sum and difference of the signals from the two photoelectric cells may be obtained in a simple manner. In this arrangement, which represents a measuring instrument for indicating the instantaneous dimension of a ball or sphere being processed, an optical slit in a diaphragm 304 is transilluminated by means of a lamp 301 and a condenser 302. Light rays emerging from the optical slit and passing through a beam splitter 305 and an objective 306 are so directed as to be able to form an image of the slit at the position of the center of the ball in the absence of the ball. The diaphragm 304 is movably positioned by way of membranes 303 which are flexed by means of an electromagnetic system 319 having a pair of coils which are energized by an alternating current generator 320 having the frequency $f_0$. The rays reflected by ball 307 are reproduced or imaged back by way of the objective 306 and the beam splitter 305 onto a measuring scale 308 on which the centering of the ball with respect to the optical axis of the instrument may be read by means of an ocular 309. The reflected rays are conveyed by means of a divider or beam splitter 310 to a prism 311 and thus to two photoelectric cells 312, 313 whose output signals are respectively fed to the series-connected combination of separate primary windings 316, 315', and 315, 316' of the two transformers 317, 318 as shown in FIG. 3. The secondary windings of these transformers are interconnected with capacitors to form tank circuits, one of which is tuned to the frequency $(2n$ plus $1)f_0$, and the other one of which is tuned to the frequency $f_0$. Thus the secondary voltage of the transformer 317 corresponds to the sum of the currents of the two photoelectric cells, whereas the output voltage of the transformer 318 is proportional to the difference of the currents of the two photoelectric cells.

The output signal of transformer 318 is connected to a phase sensitive rectifier 323 to be compared with the output signal of a limiter stage 324, which latter stage 324 is connected from generator 320 by way of a phase shifting stage 321 and tuned amplifier 322 tuned to frequency $f_0$. The output signal of rectifier 323 indicates, with the aid of an indicating instrument 330, the position of the object of measurement in a first direction.

The output signal of transformer 317 is connected to a phase sensitive rectifier 328 to be compared with a phase sensitive rectifier 328 to be compared with the output signal of a limiting stage 327 connected from generator 320 by means of a phase shifting stage 325 and tuned amplifier 326 tuned to frequency $(2n+1)f_0$. The output signal of rectifier 328 indicates, with the aid of an indicating instrument 329, the position of the object of measurement in a second direction.

The operation of the device will become more apparent by analyzing the movement in the $x$ or the $z$ axis separately. Since the displacement process doesn't include non-linear operations, any complex movement can be estimated as a superimposed movement across the $x$ and $y$ axes in succession. If the object moved in the x axis direction, the relative phase position of the mark and corresponding $(2n+1)$ $f_0$ harmonic contents of the output waveforms of the photoelectric receiver and the reference scanning frequency multiple would change as follows:

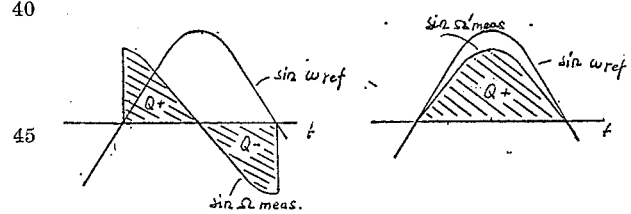

(a) initial condition (b) condition after the mark has shifted.

The phase sensitive demodulator known also as the synchronous demodulator evaluates the positive or negative samples of the amplified signal from the photosensitive receiver gated by the $(2n+1)f_0$ reference frequency. The resultant output voltage is equal to the:

$$V = C/Q$$

where:

$Q = i \cdot dt$ sum of the areas below and above the zero axes. $(\Sigma Q \pm)$ $C$ = total capacitor load on the output of the demodulator circuit.

While several preferred embodiments of the present invention have been particularly shown and described, it will be apparent that alternate embodiments and/or modifications may be made therein within the spirit and scope of the invention, and it is desired, therefore, that only such limitations be placed on the invention as are imposed by the prior art and set forth in the appended claims.

I claim:

1. An optical measuring instrument for measuring in two coordinate directions including a direction parallel to the optical aiming axis, comprising in operational sequence along said axis, a source of light, including means to produce at least one cyclically moving scanning mark, an exit pupil lying in a plane perpendicular to said optical axis, an object with a graduated scale fixedly mounted to said object; and further comprising means for directing light rays from said means to produce said cyclicly moving scanning mark onto said scale and object, sensing means beyond said object for sensing the symmetry of the light distribution in a said plane perpendicular to the path of said light rays, and phase determining means for determining the phase position in the cycle of movement of said mark of an irregularity in said distribution which changes its phase position in accordance with the position of said object.

2. An optical measuring instrument as claimed in claim 1 in which said sensing means comprises at least a pair of photoelectric cells and said phase determining means comprises means to add and to subtract the outputs of said cells, means to derive from the sum of the output signals an indication of the lateral position of said object with respect to the axis of said means for directing light rays, and means to derive from the difference of the output signals an indication of the axial position of said object in a direction parallel to said axis.

3. An optical measuring instrument as claimed in claim 2 including transformer means connected to said cells for determining the sum and the difference of the output signals.

4. An optical measuring instrument as claimed in claim 1 in which said sensing means comprises a single photoelectric cell, a pupil located in said plane, and means to oscillate said cell between two halves of an image of said pupil.

5. An optical measuring instrument as claimed in claim 1 including means for displacing said object, and feed-back means to utilize the output signals of said phase determining means as control signals for controlling said means for displacing said object for correction of the position of said object in accordance with the phase position of said irregularity.

References Cited

UNITED STATES PATENTS

| | | | |
|---|---|---|---|
| 2,694,804 | 11/1954 | Wagner | 340—282 |
| 2,696,565 | 12/1954 | Shockley | 250—201 |
| 3,133,200 | 5/1964 | Collyes | 250—203 |
| 3,254,227 | 5/1964 | Hock | 88—14 |

FOREIGN PATENTS 1,027,457    4/1966    Great Britain.

RONALD L. WIBERT, Primary Examiner

J. ROTHENBERG, Assistant Examiner

U.S. Cl. X.R.

250—232, 235; 356—172; 365—170